under 35 U.S.C. 154(b) by 1168 days.

(12) United States Patent
Costanza et al.

(10) Patent No.: US 7,831,966 B2
(45) Date of Patent: Nov. 9, 2010

(54) AUTOMATED PATCH DETECTION NOTIFICATION PROCESS

(75) Inventors: Thomas J. Costanza, Webster, NY (US); Ravi S. Kasarla, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1168 days.

(21) Appl. No.: 11/477,250

(22) Filed: Jun. 29, 2006

(65) Prior Publication Data

US 2008/0005170 A1  Jan. 3, 2008

(51) Int. Cl.
*G06F 9/45* (2006.01)

(52) U.S. Cl. ..................................... 717/168
(58) Field of Classification Search ................. 717/168
See application file for complete search history.

(56) References Cited

U.S. PATENT DOCUMENTS 5,155,847 A * 10/1992 Kirouac et al. .............. 709/221
7,552,430 B2 * 6/2009 Napier et al. ................ 717/169
2002/0174422 A1 * 11/2002 Kelley et al. ................ 717/178
2004/0153823 A1 * 8/2004 Ansari ......................... 714/38
2007/0106979 A1 * 5/2007 Felts ........................... 717/124

* cited by examiner

*Primary Examiner*—John Chavis
(74) *Attorney, Agent, or Firm*—Gibb I.P. Law Firm, LLC

(57) ABSTRACT

An automated patch detection notification process detects the effects and impacts of application patches on application objects, including but not limited to custom code when applied to the Enterprise Platform Delivery ("EPD") software platform. It detects and notifies any and all affected parties that a patch, once installed, may overwrite or otherwise affect application objects that are dependent on the software application code that was patched. A list of files/objects that are of concern to the EPD group is assembled. This list names which objects that we would like notification if and when a patch touches it. A snap shot of the EPD software application platform is taken before and after a patch is applied. These snap shots are used to compare and comprehend the changes with the list of objects provided by the EPD team. Once a potential impact has been detected, an e-mail is sent to the responsible parties.

8 Claims, 2 Drawing Sheets

AUTOMATED PATCH DETECTION NOTIFICATION PROCESS

BACKGROUND OF THE INVENTION

It is known to arrange information management systems with various software applications. For example, ORACLE software applications are available from Oracle International Corporation, a Corporation of the State of California, 500 Oracle Parkway, Redwood City, Calif. 94065.

NOTE: The term "ORACLE" is a trademark of the aforementioned Oracle International Corporation.

It is also known that software suppliers commonly provide software patches for installation in their software applications. For example, the foregoing Oracle International Corporation commonly provides ORACLE software patches for installation in its ORACLE software applications.

A patch detection notification process for use in an information management system is known.

For example, referring now to FIG. 1, there is depicted an information management system 100 suitable for demonstrating a patch detection notification process. As shown, there are provided one or more application servers 10.

The application servers 10, in turn, include one or more software applications, the foregoing one or more applications being depicted in FIG. 1 by the reference numbers 30, 30'.

Still referring to FIG. 1, in one embodiment the one or more applications 30, 30' comprise only one (1) application.

In another embodiment, the one or more applications 30, 30' comprise a plurality (n) of applications, where "n" is an integer equal to or greater than 2; thus n equals 2, 3, 4, 5, 6, 7, or a greater value.

Still referring to the application servers 10, there are also included therein one or more corresponding sets of objects of interest, the foregoing sets of objects of interest being depicted by reference numbers 50, 50'.

For each of the applications 30, 30' there is a corresponding set of object of interest 50, 50'. For example, in the particular embodiment depicted in FIG. 1, the set of objects of interest 50 corresponds to the application 30, and the set of objects of interest 50' corresponds to the application 30'.

As shown, the application servers 10 are arranged to receive a software patch 1 by means of a communication link or path 91.

Referring still to FIG. 1, the patch detection notification process is arranged to provide patch detection notification 3 to the one or more parties of interest 60 EPD Team 60 by means of the communication link or path 92.

In one embodiment, the parties 60 comprise an Enterprise Platform Delivery ("EPD") Team, which Enterprise Platform Delivery Team is hereinafter referred to simply as an "EPD" Team.

Referring now to FIG. 2, the patch detection notification process comprises the depicted eight (8) steps respectively labeled 209, 211, 213, 215, 217, 219, 221 and 223.

Still referring to FIG. 2, with cross-reference to FIG. 1, the patch detection notification process now is described.

The patch detection notification process begins at step 209. In step 209 the application server 10 receives a patch 1 that is intended for a particular target application 30, 30' that is comprised in the application server 10.

Referring back to FIG. 1, for good understanding, in step 209 the patch 1 is provided by a patch supplier 80 and is communicated to the application server 10 by means of the communication link or path 1.

Returning again to FIG. 2, after step 209, the process goes to step 211.

In step 211 the process identifies the particular set of objects of interest 50, 50' which correspond to the target application 30, 30' from amongst the sets of objects of interest 50, 50' that are stored in the application server 10, thus forming an identified set of objects of interest 50, 50'.

Referring back to FIG. 1, for good understanding, when the received patch 1 is intended for the target application 30, step 211 identifies the corresponding set of objects of interest 50, thus forming the identified set of objects of interest 50. Conversely, when the received patch 1 is intended for the target application 30', step 211 identifies the corresponding set of objects of interest 50', thus forming the identified set of objects of interest 50'.

Returning again to FIG. 2, after step 211 the process goes to step 213.

In step 213, for each object in the identified set of objects of interest 50, 50', the process determines a corresponding first state in the target application 30, 30'.

Referring back to FIG. 1, for good understanding, when the target application is application 30, step 213 determines a first state in application 30 for each object in the identified set of objects of interest 50. Conversely, when the target application is application 30', step 213 determines a first state in application 30' for each object in the identified set of objects of interest 50'.

Returning again to FIG. 2, after step 213 the process then goes to step 215.

In step 215, the process installs the patch 1 in the target application 30, 30'.

Referring back to FIG. 1, for good understanding, when the target application is application 30, step 215 installs the patch 1 in application 30. Conversely, when the target application is application 30', step 215 installs the patch 1 in application 30'.

Returning again to FIG. 2, after step 215 the process goes to step 217.

In step 217, for each object in the identified set of objects of interest 50, 50', the process determines a corresponding second state in the target application 30, 30'.

Referring back to FIG. 1, for good understanding, when the target application is application 30, step 217 determines a second state in application 30 for each object in the identified set of objects of interest 50. Conversely, when the target application is application 30', step 217 determines a second state in application 30' for each object in the identified set of objects of interest 50'.

Returning again to FIG. 2, after step 217 the process goes to step 219.

In step 219, for each object in the identified set of objects of interest 50, 50', the process compares the each object's corresponding first and second states in the target application 30, 30'.

Referring back to FIG. 1, for good understanding, when the target application is application 30, step 219 compares the first and second states in application 30 for each object in the identified set of objects of interest 50. Conversely, when the target application is application 30', step 219 compares the first and second states in application 30' for each object in the identified set of objects of interest 50'.

Returning again to FIG. 2, after step 219 the process goes to step 221.

In step 221, for each object in the identified set of objects of interest 50, 50', when the each object's first and second states in the target application 30, 30' differ, the process notifies one or more interested parties 60.

Referring back to FIG. 1, for good understanding, when the target application is application 30, for each object in the identified set of objects of interest 50, step 221 notifies one or more interested parties 60 when the object's first and second states in application 30 are different. Conversely, when the target application is application 30', for each object in the identified set of objects of interest 50', step 221 notifies one or more interested parties 60 when the object's first and second states in application 30' are different.

Still further to step 221, it will be understood that the "one or more interested parties" described in step 221 are depicted in FIG. 1 by the "parties", reference number 60. In one embodiment, the parties comprise an Enterprise Platform Delivery Team, or EPD Team.

Returning again to FIG. 2, after step 221 the process goes to step 223.

In step 223 the patch detection notification process is done.

Using conventional technology, once a patch is identified and distributed, human intervention is required (more than one person most times) to manually review and inspect the contents of the patch, analyze if the patch "touched" code they are dependent on, and then once the patch is applied, test to see if they are truly impacted. This is a time consuming and error prone process.

Thus, there is a need for the present invention.

BRIEF SUMMARY OF THE INVENTION

In a first aspect of the invention, there is described an automated patch detection notification process for use in an information management system, the process including:
(a) for each application that is comprised in an included application server, populate a corresponding set of objects of interest;
(b) for each application, store the corresponding set of objects of interest;
(c) for each application, create an object list file which includes the set of objects of interest corresponding to the each application;
(d) for each application, pull the corresponding object list file and store the corresponding set of objects of interest included therein in the application server, thus forming pulled and stored sets of objects of interest;
(e) receive a patch for a target application comprised in the application server;
(f) identify the set of objects of interest corresponding to the target application as comprised in the pulled and stored sets of objects of interest, thus forming an identified set of objects of interest;
(g) for each object in the identified set of objects of interest, determine a corresponding first state in the target application;
(h) install the patch in the target application;
(i) for each object in the identified set of objects of interest, determine a corresponding second state in the target application;
(j) for each object in the identified set of objects of interest, compare the each object's first and second states in the target application; and
(k) for each object in the identified set of objects of interest, when the each object's first and second states in the target application differ, notify one or more interested parties.

DETAILED DESCRIPTION OF THE INVENTION

In fine, an automated patch detection notification process detects the effects and impacts of application patches on application objects, including but not limited to custom code, when applied to the Enterprise Platform Delivery ("EPD") software platform. It detects and notifies any and all affected parties that a patch, once installed, may overwrite or otherwise affect application objects that are dependent on the software application code that was patched. A list of files/objects that are of concern to the EPD group is assembled. This list names which objects that we would like notification if and when a patch touches it. A snap shot of the EPD software application platform is taken before and after a patch is applied. These snap shots are used to compare and comprehend the changes with the list of objects provided by the EPD team. Once a potential impact has been detected, an e-mail is sent to the responsible parties. In one embodiment, the software application is an ORACLE software application. In one embodiment, the patch is an ORACLE patch.

Figure 1:
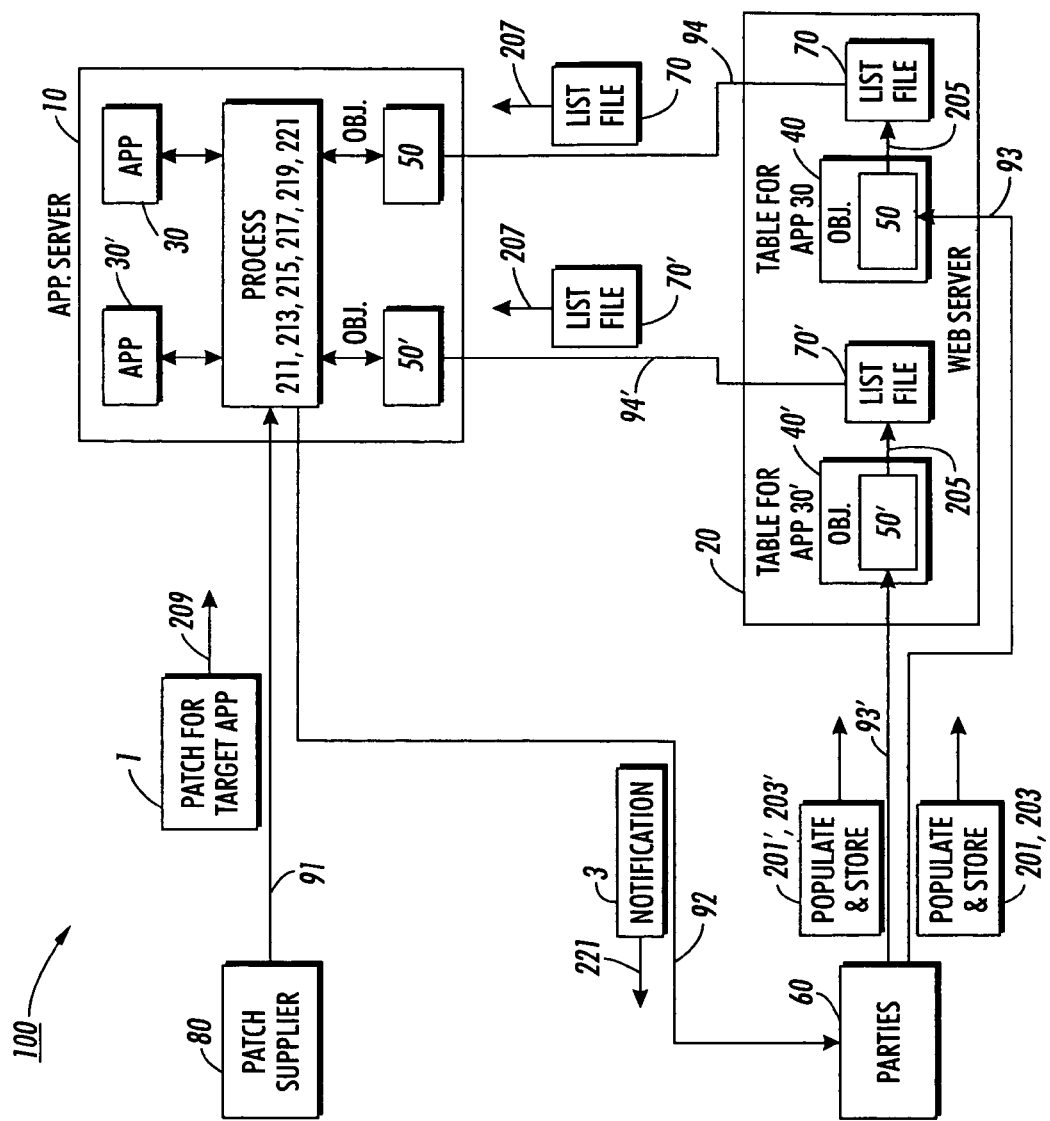
FIG. 1 depicts an information management system 100 suitable for demonstrating an automated patch detection notification process, in accordance with the present invention.

Referring now to FIG. 1, there is depicted an information management system 100 suitable for demonstrating an automated patch detection notification process. As shown, the information management system 100 comprises one or more application servers 10 and a development web server 20.

As described in the "Background of the Invention" section hereinabove, the application servers 10, in turn, comprise one or more applications 30, 30'.

The development web server 20, in turn, comprises a table. The table is logically defined into 40 and 40'. A key identifier accesses the subset of data in the table. This platform identifier corresponds accordingly to each application 30, 30' comprised in the application servers 10. So first application server 30 compromises a subset of data in table 40, as does application server 30' compromises a subset of data in table 40'.

In the depicted embodiment, for example, as the application servers 10 include a first application 30 and a second application 30', accordingly, the depicted development web server 20 comprises a corresponding a table of data subdivided into table 40 and 40'. For good understanding, a subset of data in the table 40 in the web server 20 corresponds to the application 30 in the application server 10; and another subset of data in table 40' in the web server 20 corresponds to application 30' in the application server 10.

Figure 2:
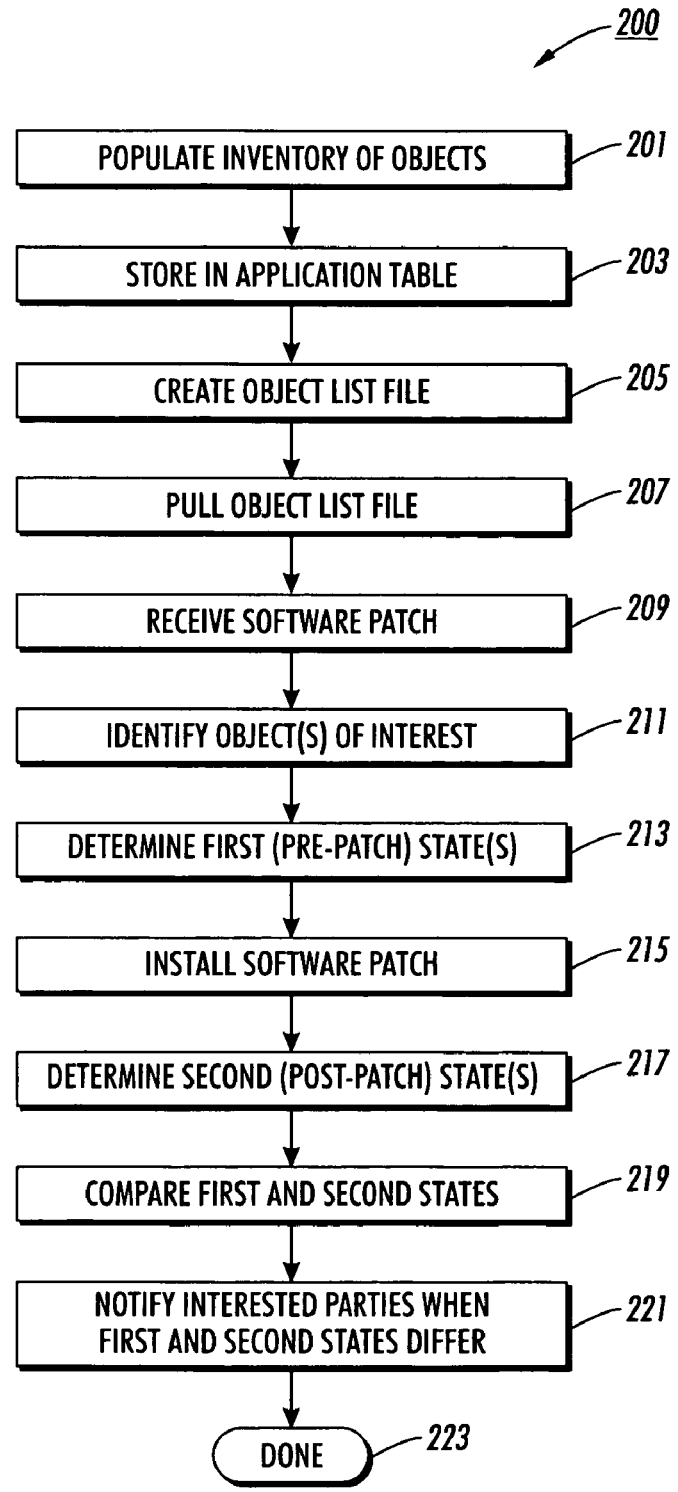
FIG. 2 is a flow diagram 200 for one embodiment of an automated patch detection notification process, in accordance with the present invention. As shown, the automated patch detection notification process comprises the depicted twelve (12) steps respectively labeled 201, 203, 205, 207, 209, 211, 213, 215, 217, 219, 221 and 223. With cross-reference to the foregoing "Background of the invention" section, it will be understood that the automated patch detection notification process comprises the depicted initial or leading four (4) steps respectively labeled 201, 203, 205 and 207 in combination with the previously-known and existing patch detection notification process comprising the eight (8) steps respectively labeled 209, 211,213, 215, 217, 219, 221 and 223, which same eight (8) steps are previously described in the "Background of the Invention" section hereinabove. Therefore, when the present invention is compared to the previously-known and existing patch detection notification process as described in such "Background" section, the improvement of the present invention, namely, the automated patch detection notification process, is seen to be comprised in the depicted initial or leading four (4) steps respectively labeled 201, 203, 205 and 207.

Referring now to FIG. 2, there is depicted the automated patch detection notification process 200. As shown, the automated patch detection notification process 200 comprises the twelve (12) steps respectively labeled 201, 203, 205, 207, 209, 211, 213, 215, 217, 219, 221 and 223.

Still referring to FIG. 2, the automated patch detection notification process now is described.

The process begins at step 201. In step 201, for each application 30, 30' that is comprised in the application server 10, the process populates a corresponding inventory or "set" of objects of interest 50, 50'.

Note that, as used herein, the terms "inventory" and "set" are used interchangeably.

Referring back to FIG. 1, for good understanding, in step 201 the parties 60 populate a first inventory or set of objects of interest 50 corresponding to the first application 30 in the application server 10. Likewise, in step 201 the parties 60 also populate a second inventory or set of objects of interest 50' corresponding to the second application 30' in the application server 10.

In one embodiment, the parties 60 comprise an Enterprise Platform Delivery Team, or EPD Team.

Returning again to FIG. 2, after step 201 the process goes to step 203.

In step 203, for each application 30, 30' that is comprised in the application server 10, the process stores the corresponding set of objects of interest 50, 50' in a corresponding table 40, 40' in the development web server 20.

Referring back to FIG. 1, for good understanding, in step 203 the set of objects of interest 50 are stored in table 40 in the development web server 20 by means of the depicted first communication link or path 93; wherein the table 40, in turn, corresponds to the application 30 in the application server 10. Likewise in step 203, the set of objects of interest 50' also are stored in table 40' in the development web server 20 by means of the depicted second communication link or path 93'; wherein the table 40', in turn, corresponds to the application 30' in the application server 10.

Returning again to FIG. 2, after step 203 the process goes to step 205.

In step 205, for each application 30, 30' that is comprised in the application server 10, the process creates an object list file 70, 70' which includes the set of objects of interest 50, 50' corresponding to the each application 30, 30'.

Referring back to FIG. 1, for good understanding, step 205 creates a first object list file 70 including the first set of objects of interest 50 corresponding to the first application 30. Likewise, step 205 also creates a second object list file 70' including the second set of objects of interest 50' corresponding to the second application 30'.

Returning again to FIG. 2, after step 205 the process goes to step 207.

In step 207, for each application 30, 30' that is comprised in the application server 10, the process pulls the corresponding object list file 70, 70' from the web server 20 and stores the corresponding set of objects of interest 50, 50' included therein in the application server 10, thus forming pulled and stored sets of objects of interest 50, 50' in the application server 10.

Referring back to FIG. 1, for good understanding, step 207 pulls the first object list file 70 from the web server 20 and stores the corresponding set of objects of interest 50 included therein in the application server 10 by means of the depicted third communication link or path 94, thus forming the first pulled and stored set of objects of interest 50 in the application server 10. Likewise, step 207 also pulls the second object list file 70' from the web server 20 and stores the corresponding set of objects of interest 50' included therein in the application server 10 by means of the depicted fourth communication link or path 94', thus forming the second pulled and stored set of objects of interest 50' in the application server 10.

Returning again to FIG. 2, after step 207 the process goes to step 209.

In step 209, as previously described in the "Background of the Invention" section hereinabove, the process receives a patch 1 for a particular target application 30, 30' that is comprised in the application server 10. The process then goes to step 211.

In step 211, as previously described in the "Background of the Invention" section hereinabove, the process identifies the set of objects of interest 50, 50' corresponding to the target application 30, 30' as comprised in the pulled and stored sets of objects of interest 50, 50' in the application server 10, thus forming an identified set of objects of interest 50, 50'. The process then goes to step 213.

In step 213, as previously described in the "Background of the Invention" section hereinabove, for each object in the identified set of objects of interest 50, 50', the process determines a corresponding first state in the target application 30, 30'. The process then goes to step 215.

In step 215, as previously described in the "Background of the Invention" section hereinabove, the process installs the patch in the target application 30, 30'. The process then goes to step 217.

In step 217, as previously described in the "Background of the Invention" section hereinabove, for each object in the identified set of objects of interest 50, 50', the process determines a corresponding second state in the target application 30, 30'. The process then goes to step 219.

In step 219, as previously described in the "Background of the Invention" section hereinabove, for each object in the identified set of objects of interest 50, 50', the process compares the each object's first and second states in the target application 30, 30'. The process then goes to step 221.

In step 221, as previously described in the "Background of the Invention" section hereinabove, for each object in the identified set of objects of interest 50, 50', when the each object's first and second states in the target application 30, 30' differ, the process notifies one or more interested parties 60.

Still referring to step 221, in one embodiment the one or more interested parties 60 comprise the Enterprise Process Development team.

After step 221 is completed, the automated patch detection notification process is then done, step 223.

In summary, the automated patch detection notification process 200 depicted in FIG. 2 and described in connection with FIG. 2 above, may be divided into five (5) Sequences I, II, III, IV and V as described below.

Sequence I, "Define Object Tracking List" comprises steps 201 and 203 in FIG. 2. Here we maintain list of objects that we want to monitor in our EPD/XIM Developer Oracle Database in the development web server 20. This database and application supports our developer and development processes.

One of these applications is a new step 201 comprising, for each application 30, 30' that is comprised in the application server 10, to populate a corresponding inventory or set of objects of interest 50, 50' to be monitored, via a development web server front end, which is access able from the web-based developer home page application in the development web server 20. This latter home page application is available to developers around the world.

In step 203, for each application 30, 30', the corresponding set of objects of interest 50, 50' to be monitored is input and stored by the developers/functional teams 60 via this home page application into a corresponding Oracle database table 40, 40' in the development web server 20.

NOTE: The term "ORACLE" is a trademark of the aforementioned Oracle International Corporation.

Each table 40 and 40' contains the following twelve (13) information items labeled "A" through "M":

A. Object Name;

B. Object Type. We monitor many different object types, and this list keeps growing, currently we have the following Object Types: PACKAGE, FUNCTION_FORM, MENU_PROMPT, MENU_FORM, INDEX, DESCRIBE_OBJECT, FS, DB;

C. Object Location;

D. Module Name;

E. Notification E-mails;

F. PE Number;

G. Description;

H. Install Dependency;

I. Developer Name E-Mail;

J. Package Name;

K. Procedure Name; and

L. Customized Flag.

M. Comments

Sequence II, "Upload patch information to Server", comprises steps 205 and 207 in FIG. 2.

In step 205, for each application 30, 30', the corresponding set of objects of interest 50, 50' data loaded into the table 40, 40' is converted into a corresponding tab de-limited file 70, 70' and, in step 207, uploaded to the application server 10. Code was developed in order to facilitate the automation of this process across the platform.

In step 207, for each application 30, 30', the corresponding tab de-limited file 70, 70' is pulled from the development web server 20 and the corresponding set of objects of interest 50, 50' included therein is stored in the Oracle application server 10, thus forming pulled and stored sets of objects of interest 50, 50' in the application server 10.

Sequence III, "Patch file distribution", comprises step 209 in FIG. 2. Here, once the patch info file 1 is received and uploaded, this file is distributed across servers and multiple database instances that are present on each server 10. All the database instances to which this file has to be propagated are maintained in a configuration file, which is updatable.

Sequence IV, "Pre and Post patch Processing", comprises steps 211 through 219 in FIG. 2. Here object information is collected and compared to determine the objects affected by the patch. The pre- and post-processing steps are identical.

Patch Info List is taken and objects are analyzed depending on the object types. The list of object types is growing and currently the following object types as described below, are being monitored in the following eight (8) information items labeled "A" through "H":

A. PACKAGE. This Object type is the application software's Object Package Header and Package Body. The source of this object is stored in "ALL_SOURCE" table and we get the total character count for the object. This is done before and after the patch is applied to determine if this object was changed.

B. FUNCTION_FORM. This Object type is the software's application function definition for a Function Form. We check if this Function-Form relationship exists before the patch and if it still exists after the patch or has been wiped out by the patch.

C. MENU_PROMPT. This Object type is the software application's Menu Prompt definition. We check if this Menu-Prompt relationship exists before the patch and if it still exists after the patch or has been wiped out by the patch.

D. MENU_FORM. This Object type is the software application's Menu Form definition. We check if this Menu-Form relationship exists before the patch and if it still exists after the patch or has been wiped out by the patch.

E. INDEX. This Object type is the software application's Table index. We check if this Index exists before the patch and if it still exists after the patch or has been wiped out by the patch. This is especially useful for custom indexes that we define on the software application's tables.

F. DESCRIBE_OBJECT. This Object type can be a table, view or any other object that can be described. We check if description of the object is the same after the patch has been applied. This is especially useful for the software application objects that have been modified by Xerox.

G. FS. These are application server files. We customize the software application's JSP and other files that reside on the application server. Any impact to these files by a patch is monitored.

H. DB. These are database server files. We customize the software application's reports and other files that reside on the database server. Any impact to these files by a patch is monitored.

After the patch installation step 215 is complete, post patch processing, comprising steps 217 and 219, is run to determine which objects have been changed by the patch, these latter objects being referred to as the "changed objects" below.

Sequence V, "Patch Notification", comprises step 221 in FIG. 2. Here the process determines each changed object and a corresponding e-mail address to which the process should notify the change and creates a customized e-mail with a spread sheet attachment describing the impact. This latter customized e-mail is depicted in FIG. 1 by reference number 3. The Pre- and Post-patch status of each object that this owner owns and which has been modified by the patch will be present in the e-mail attachment. MIME types and UNIX send-mail is used to achieve this task. The subject of this e-mail has the patch number, database name and location.

Next is the automated propagation of the e-mail notification 3 to required environments. Previous to the present invention, this was a manually intensive process, more prone to errors. New requirement arose as more projects started using this process. Notification process is automatically propagated to the appropriate database instances.

Enhancements that are currently being worked on include the following:

In a first enhancement, as is known, more and more software applications are implemented in JAVA software, available from Sun Microsystems, Inc., a Corporation of the State of Delaware, 4150 Network Circle, Santa Clara, Calif. 95054.

NOTE: The term "JAVA" is a trademark of the aforementioned Sun Microsystems, Inc.

Currently we look at the JAR and ZIP changes, which does not give the granular changes to specific JAVA classes. Changing this to explode the JAR/ZIP file recursively to check for specific changes. This will allow us to expand the "types" of objects that the process will evaluate, specifically JAVA classes.

A second enhancement is automatic determination of which objects to evaluate. Prior to this change someone needed to maintain a spreadsheet of objects that need to be compared. The determination of what should be on this spreadsheet is sometimes subject to error. The new improvement is to Compare Objects between Development environment and Patch environment and provide recommendation one what objects should be monitored.

In a third enhancement, as we are always looking to improve upon the usage, utilization and utility of this process the next release will be expanded to include Notification or new objects types to Index, Triggers, Functions, Concurrent Request and Value Sets.

Some advantages of the present invention now are discussed.

In a first advantage, the patch detection process automatically detects a potential impact. In the past this was a manual process, subject to human error.

In a second advantage, this process is performed immediately when the patch is applied. There is no time lag between when the patch is applied and when the detection is performed. Prior to this a person had to take the time and effort to review this. Sometimes this was not even performed due to other priorities or other reasons.

In a third advantage, there is provided Immediate Personalized notification to the EPD personnel for the area for which such personnel is responsible.

Thus, there is described the first aspect of the invention, substantially as described in claim 1 hereinbelow, namely, an automated patch detection notification process (200) for use in an information management system (100), the process including:

(a) for each application 30, 30' that is comprised in an included application server 10, populate (step 201) a corresponding set of objects of interest 50, 50';

(b) for each application 30, 30', store (step 203) the corresponding set of objects of interest 50, 50';

(c) for each application 30, 30', create (step 205) an object list file 70, 70' which includes the set of objects of interest 50, 50' corresponding to the each application 30, 30';

(d) for each application 30, 30', pull (step 207) the corresponding object list file 70, 70' and store the corresponding set of objects of interest 50, 50' included therein in the application server 10, thus forming pulled and stored sets of objects of interest 50, 50';

(e) receive (step 209) a patch 1 for a target application 30, 30' comprised in the application server 10;

(f) identify (step 211) the set of objects of interest 50, 50' corresponding to the target application 30, 30' as comprised in the pulled and stored sets of objects of interest 50, 50', thus forming an identified set of objects of interest 50, 50';

(g) for each object in the identified set of objects of interest 50, 50', determine (step 213) a corresponding first state in the target application 30, 30';

(h) install (step 215) the patch in the target application 30, 30';

(i) for each object in the identified set of objects of interest 50, 50', determine (step 217) a corresponding second state in the target application 30, 30';

(j) for each object in the identified set of objects of interest 50, 50', compare (step 219) the each object's first and second states in the target application 30, 30'; and (k) for each object in the identified set of objects of interest 50, 50', when the each object's first and second states in the target application 30, 30' differ, notify (step 221) one or more interested parties 60.

In one embodiment, substantially as described in claim 2 hereinbelow, the software application 30 comprises an ORACLE software application.

In a further embodiment, substantially as described in claim 3 hereinbelow, the patch 1 comprises an ORACLE patch.

In another embodiment, substantially as described in claim 4 hereinbelow, there is included a step (b') of storing (step 203) the set of objects of interest 50, 50' for each application 30, 30' in a table 40, 40', where the table 40, 40' corresponds to the each application 30, 30'.

In a still further embodiment, substantially as described in claim 5 hereinbelow, the table 40, 40' is comprised in an included development web server 20.

In still another embodiment, substantially as described in claim 6 hereinbelow, the set of objects of interest 50, 50' populating step (a) (step 201) is performed by at least one of the one or more interested parties 60.

In yet a still further embodiment, substantially as described in claim 7 hereinbelow, the set of objects of interest 50, 50' storing step (b) (step 203) is performed by the at least one of the one or more interested parties 60.

In yet still another embodiment, substantially as described in claim 8 hereinbelow, the one or more interested parties 60 comprise an Enterprise Plafform Delivery team.

The table below lists the drawing element reference numbers together with their corresponding written description:

| Ref. No.: | Description: |
|---|---|
| 1 | patch for target application |
| 3 | patch detection notification |
| 10 | one or more application servers |
| 20 | development web server |
| 30 | application |
| 30' | application |
| 40 | table for application 30 |
| 40' | table for application 30' |
| 50 | set of objects of interest |
| 50' | set of objects of interest |
| 60 | parties |
| 70 | object list file |
| 70' | object list file |
| 80 | patch supplier |
| 91-93, 93', 94, 94' | communication links or paths |
| 100 | information management system |
| 200 | automated patch detection notification process |
| 201 | populate an inventory (or "set") of objects of interest |
| 203 | store in application table |
| 205 | create object list file including the set of objects of interest |
| 207 | pull object list file from the web server |
| 209 | receive patch for a target application |
| 211 | identify the set of objects of interest corresponding to the target application, thus forming an identified set of objects of interest |
| 213 | determine first ("Pre-Patch") state(s) in the target application |
| 215 | install patch in the target application |
| 217 | determine second ("Post-Patch") state(s) in the target application |
| 219 | compare first and second states |
| 221 | notify interested parties when first and second states differ |
| 223 | done |

While particular embodiments of an automated patch detection notification process, in accordance with the present invention, have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An automated patch detection notification process for use in an information management system, the process including:
   (a) for each application that is comprised in an included application server, populate a corresponding set of objects of interest;
   (b) for each application, store the corresponding set of objects of interest;
   (c) for each application, create an object list file which includes the set of objects of interest corresponding to the each application;
   (d) for each application, pull the corresponding object list file and store the corresponding set of objects of interest included therein in the application server, thus forming pulled and stored sets of objects of interest;
   (e) receive a patch for a target application comprised in the application server;
   (f) identify the set of objects of interest corresponding to the target application as comprised in the pulled and stored sets of objects of interest, thus forming an identified set of objects of interest;
   (g) for each object in the identified set of objects of interest, determine a corresponding first state in the target application;
   (h) install the patch in the target application;
   (i) for each object in the identified set of objects of interest, determine a corresponding second state in the target application;
   (j) for each object in the identified set of objects of interest, compare the each object's first and second states in the target application; and
   (k) for each object in the identified set of objects of interest, when the each object's first and second states in the target application differ, notify one or more interested parties.

2. The automated patch detection notification process of claim 1, where each application comprises an ORACLE software application.

3. The automated patch detection notification process of claim 2, where the patch comprises an ORACLE software application patch.

4. The automated patch detection notification process of claim 1, including a step of storing the set of objects of interest for each application in a table, where the table corresponds to the each application.

5. The automated patch detection notification process of claim 4, where the table is comprised in an included development web server.

6. The automated patch detection notification process of claim 1, where the set of objects of interest populating step (a) is performed by at least one of the one or more interested parties.

7. The automated patch detection notification process of claim 6, where the set of objects of interest storing step (b) is performed by the at least one of the one or more interested parties.

8. The automated patch detection notification process of claim 7, where the one or more interested parties comprise an Enterprise Plafform Delivery team.

* * * * *